United States Patent [19]
Gray et al.

[11] 3,770,612
[45] Nov. 6, 1973

[54] APPARATUS FOR ELECTROLYTIC OXIDATION OR REDUCTION, CONCENTRATION, AND SEPARATION OF ELEMENTS IN SOLUTION

[75] Inventors: John H. Gray; Alfred Schneider, both of Morristown, N.J.; Anthony F. Cormak, Tonawanda, N.Y.; Arnold L. Ayers, Convent Station, N.J.

[73] Assignee: Allied Chemical Corporation, New York, N.Y.

[22] Filed: Aug. 24, 1970

[21] Appl. No.: 66,310

[52] U.S. Cl. .............. 204/261, 204/1.5, 204/262, 204/273, 423/8
[51] Int. Cl. ............................................. C22d 1/02
[58] Field of Search ................. 204/1.5, 261, 262, 204/266, 273, 263; 423/8

[56] References Cited
UNITED STATES PATENTS

| | | | |
|---|---|---|---|
| 3,616,276 | 10/1971 | Schneider et al. | 204/1.5 |
| 761,284 | 5/1904 | Buchner | 204/262 |
| 1,403,463 | 1/1922 | Allingham | 204/261 |
| 3,730,851 | 5/1973 | Schwind et al. | 204/1.5 |

*Primary Examiner*—John H. Mack
*Assistant Examiner*—W. I. Solomon
*Attorney*—Ernest A. Polin and Luther A. Marsh

[57] ABSTRACT

Apparatus for performing a liquid-liquid extraction and electrolysis comprising a closed hollow container equipped with means for countercurrently contacting streams of liquid, means for creating turbulence in the liquid mixture, means for passing an electrical charge through the liquid mixture, and means for retarding the passage of liquid through the container. In one embodiment, the means for creating turbulence in the liquid mixture comprises a rotatable shaft with agitator blades mounted thereon and, in another embodiment, comprises a pulse wave generator. The apparatus is capable of carrying out a wide variety of liquid-liquid extractions and electrolysis reactions, but is particularly applicable to processes for changing the valence state of a metal of variable valence state to effect its separation from other metals and for concentrating metals of variable valence state in solution.

In the process of the invention simultaneous valence change of a metal of variable valence state and concentration of that metal in aqueous solution is accomplished by passing a continuous stream of an aqueous solution through a column, passing a continuous stream of an organic solution of at least one metal of variable valence state which is preferentially soluble in the aqueous solution in its changed valence state countercurrently through the column, while maintaining the flow ratio of organic solution to aqueous solution greater than 1:1, forming a dispersion containing a continuous aqueous phase by creating turbulence in a zone where both the aqueous solution and the organic solution are present, allowing the dispersion to contact one electrode of an electrolytic cell which has its electrodes separated by a porous membrane, passing an electric current through the dispersion, and separating the immiscible organic and aqueous phases. This process is particularly useful to reduce hexavalent uranium to tetravalent uranium, to reduce tetravalent plutonium to trivalent plutonium, to concentrate these metals in solution in their changed valence states, and to separate plutonium from uranium.

22 Claims, 17 Drawing Figures

United States Patent [19]
Gray et al.

INVENTORS.
John H. Gray, Alfred Schneider,
Anthony F. Cermak & Arnold L. Ayers
BY Vay P. Friedenson
ATTORNEY.

3,770,612

APPARATUS FOR ELECTROLYTIC OXIDATION OR REDUCTION, CONCENTRATION, AND SEPARATION OF ELEMENTS IN SOLUTION

CROSS-REFERENCES TO RELATED APPLICATIONS

Co-pending application of Alfred Schneider and Arnold L. Ayers, entitled "Electrochemical Concentration of Metallic Solutions," Ser. No. 815,713, filed Apr. 14, 1969, now U.S. Pat. No. 3,616,275.

Co-pending application of Alfred Schneider and Arnold L. Ayers, entitled "Electrochemical Oxidation or Reduction," Ser. No. 815,714, filed Apr. 14, 1969, now U.S. Pat. No. 3,616,276.

BACKGROUND OF THE INVENTION

Various industrial separation processes require treatment of metal compound containing solutions in which the metal, which is a metal of variable valence, is in a particular valence state. For example, tetravalent uranium compounds, such as $UF_4$, can be precipitated from organic solutions with HF. Since uranium is generally in a higher valence state, particularly the hexavalent form, it must be reduced to the tetravalent state prior to the precipitation operation.

In another example in the nuclear fuels reprocessing art, mixtures of tetravalent plutonium and hexavalent uranium in organic solution can be separated from each other by selective extraction with an immiscible aqueous solution whereby the uranium remains in the organic phase and the plutonium transfers to the aqueous phase. The plutonium, which is generally in its tetravalent state, must be reduced to the trivalent state in order to permit this separation.

It is known that such changes in valence state can be effected by means of a reducing agent such as iron. While such reducing agents effectively reduce the metal in the metal compound, contamination of the solution with the added metal results. The contaminant metal must then be removed, thereby adding to the cost of the process.

It is also known that the addition of tetravalent uranium to mixtures of hexavalent uranium and tetravalent plutonium organic solution reduces the plutonium to its trivalent state. This method eliminates the need for addition of a contaminant metal, but has the disadvantage that the added uranium may change the isotopic composition of the hexavalent uranium product. Further, the addition of uranium also adds materially to the cost of such process.

U.S. Pat. No. 3,361,651 discloses that tetravalent plutonium in a dilute nitric acid solution with hexavalent uranium can be reduced to its trivalent state electrolytically. This process has the disadvantage that the metals must be in aqueous solution. In order to obtain the metals in aqueous solution, they must first be extracted with a nitric acid solution.

For various purposes, it is necessary to have available metal solutions such as those obtained by the separation methods described above, in particular concentrations. Evaporation of the solvent is the usual method of concentrating dilute aqueous solutions of one or more metals. In the case of metals obtained from the reprocessing of nuclear fuels, and plutonium in particular, such method is disadvantageous because plutonium may be lost due to polymerization and subsequent precipitation. The plutonium could be concentrated by forming a precipitate, as with oxalic acid, and then dissolving the precipitate, however, the apparatus required for these steps is complex, thereby adding considerable cost to the process.

There is a need in the art for method and apparatus for changing the valence state of a metal of variable valence state, such as uranium, plutonium and neptunium, to a desired valence state to accomplish specific separations and for concentrating metal compounds to a desired level. It would be particularly desirable to have available such method and apparatus which are capable of effectuating valence state change and concentration simultaneously, thereby saving operating time and avoiding the need for separate, more bulky equipment.

SUMMARY OF THE INVENTION

It is an object of the invention to provide an improved apparatus for contacting two immiscible liquids under electro-lytic conditions. It is another object of the invention to provide an improved method and apparatus for changing the valence state of a metal of variable valence state.

Another object of the invention is to provide a method and apparatus for simultaneously changing the valence state of a metal of variable valence state to effect the preferential transfer from one liquid phase to the other and concentrating the metal in changed valence state to a desired level.

It is another object of the invention to provide such method and apparatus which is additionally capable of effectuating a separation between aqueous and organic phases.

It is still another object of the invention to provide an improved method and apparatus for separating plutonium from uranium in organic solution and concentrating the plutonium in the aqueous solution thus obtained.

Still another object of the invention is to provide an improved method and apparatus for reducing hexavalent uranium to tetravalent uranium and concentrating the tetravalent uranium to a desired level.

Another object of the invention is to provide an improved method and apparatus for reducing tetravalent plutonium to trivalent plutonium to permit re-extraction from an organic into an aqueous phase and for concentrating the trivalent plutonium to a desired level.

Other objects and advantages of the invention will become apparent from the following description.

In accordance with one aspect of our invention, we have designed apparatus which fulfills the above-stated objects. The apparatus may take the form of the following described embodiments.

In one embodiment, there is provided a closed hollow container, a vent for gases at the top of the container, an inlet and an outlet for liquid at one end of the container, an inlet and an outlet for liquid at the opposite end of the container, a first electrode member mounted within the container, a second electrode member mounted within the container, a porous membrane separating the two electrode members, thereby defining a first electrode chamber and a second electrode chamber, a plurality of baffle plates mounted in spaced relation within the second electrode chamber which baffle plates may optionally be constructed of an electrically conducting material and, in such an event, may replace the second electrode, and means for creating turbulence in liquid charged to the second electrode chamber.

Preferably, the container is a column having one dimension substantially longer than the other and includes a plurality of baffle plates in addition to the first and second electrodes.

The turbulence in liquid charged to the second electrode member may be created by any suitable means. In a specific embodiment of the invention, it comprises a rotatable shaft extending longitudinally through the chamber, agitator blades mounted in spaced relation on the shaft and means for rotating the shaft. In another embodiment of the invention, the turbulence is created by pulsing liquid either through apertured plates mounted in spaced relation within the second electrode chamber or through conventional packing material. If the second electrode member is equipped with packing material, the baffles in that chamber may be omitted.

In a preferred embodiment, the apparatus is free of baffle plates and/or agitator blades in the vicinities of its end walls so that separation or organic and aqueous phases can take place in these areas.

A variety of liquid-liquid extractions under electrolytic conditions may be carried out in the above-described equipment. The equipment is particularly useful, however, for processes for simultaneously changing the valence state of a metal of variable valence state and concentrating metals in changed valence state in aqueous solution, and for separating metals of variable valence state by changing their valence state so that one of them is preferentially soluble in an aqueous solution in which it becomes concentrated. Such procedures constitute the process aspect of our invention.

The process is carried out by passing a continuous stream of an aqueous solution through a column, passing a continuous stream of an organic solution of a metal of variable valence state which is preferentially soluble in the aqueous solution in its changed valence state countercurrently through the column while maintaining the flow rate ratio of organic solution to aqueous solution greater than 1:1, forming a dispersion containing a continuous aqueous phase by creating turbulence in a zone where both the aqueous solution and the organic solution are present, allowing the dispersion to contact one electrode of an electrolytic cell which has its electrodes separated by a porous membrane, passing an electric current through the dispersion, and separating the immiscible organic and aqueous phases.

In a preferred embodiment there are maintained at the extremities of the column relatively quiescent zones wherein separation of organic and aqueous phases occurs.

Oxidation or reduction may be effected by adjusting the polarity of the electrodes which govern the passage of electricity through the system. Thus, when the electric current is passed through the dispersion which is in contact with the cathode of the electrolytic cell and which contains a reducible metal or metal complex, reduction of the metal will take place. When the electric current is passed through the dispersion which is in contact with the anode of the electrolytic cell and which contains an oxidizable metal or metal complex, oxidation of the metal takes place.

The above-described apparatus and process are particularly adapted for application in the area of nuclear fuel reprocessing using a "Purex" type process. In such applications, reduction and effective separation of plutonium from uranium may be effected without contamination or uranium isotopic alteration, the plutonium may be reduced to a lower valence state and stripped from the solution and the concentration of plutonium in the aqueous product stream may be adjusted to desired levels.

As already noted, specific reduction procedures to which the apparatus and process of the invention are particularly suited are those involving reduction of hexavalent uranium to tetravalent uranium and those involving reduction of tetravalent plutonium to trivalent plutonium. An example of an oxidation procedure used to separate elements would be the oxidation of a system containing tetravalent plutonium and tetravalent neptunium. Both these elements extract well into organic solution. Both would be oxidized, $Pu^{+4}$ into $Pu^{+6}$ and $Np^{+4}$ into $Np^{+5}(NpO_2^+)$; but $Np^{+5}$ can be made to transfer preferentially into an aqueous phase.

DETAILED DESCRIPTION OF THE INVENTION AND OF THE PREFERRED EMBODIMENTS

The materials of construction for the container body, the electrodes, the porous membrane, the apertured plates and the baffle plates, should be inert or resistant to reaction with the materials charged to the apparatus and the products prepared therein. Depending on such considerations, illustrative suitable materials of construction for the container body, the apertured plates, and the baffle members, are steel, polytetrafluoroethylene, carbon and nickel, as appropriate. The electrodes may be constructed of electrically conductive materials such as carbon, nickel, iron, tantalum, niobium and noble metals such as gold and platinum. When the apparatus is used for nuclear fuel reprocessing, in accordance with the preferred embodiment to be described in more detail hereafter, the preferred materials of construction for the electrodes are the noble metals, particularly gold or platinum. When the baffle plates serve as an electrode, they are then, of course, constructed of an electrically conductive material as described above.

The porous membrane, which separates the electrodes and defines the first and second electrode chambers, may be constructed of any material which will permit hydrogen ion diffusion and yet be impervious to large cation/migration such as migration of $Pu^{+4}$ and $UO_2^{+2}$. In this way the porous membrane prevents anolyte and catholyte mixing. Some porosity is desirable in order to permit the passage of current at a low voltage. Use of low voltages in the apparatus and process of the invention is preferred in order to minimize heat generation and reduce undesirable side reactions. The porous membrane should have a reasonable degree of structural strength and for this reason is preferably constructed of a ceramic material. Sintered porous $Al_2O_3$ has been found to be particularly effective for use in treatment of uranium and plutonium solutions. The porosity is not absolutely critical. The optimum porosity will vary with the specific materials treated. With plutonium and uranium solutions, it has been found that sintered $Al_2O_3$ having a porosity of about 1–10 microns is especially effective. Depending on the materials treated and particular needs, organic membranes may also be employed. Illustrative are the ion exchange membranes which are generally available as an anionic or cationic exchange resin in a film forming matrix such as polyethylene or a vinyl resin. Other suitable membrane materials will readily occur to those skilled in the art.

Figures 7, 8, 9:
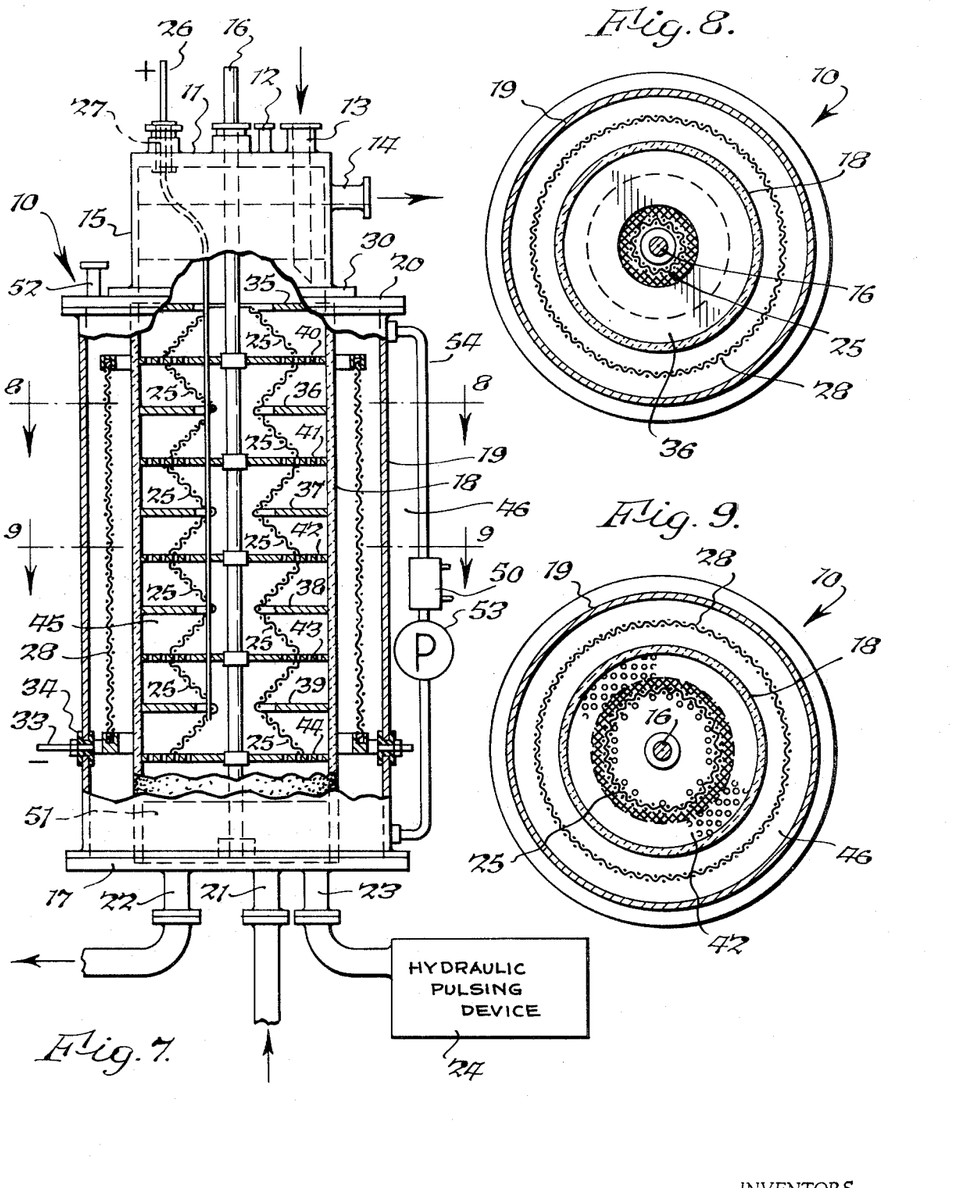
FIG. 7 is an elevational view in partial half section of another embodiment of the invention which is similar to the embodiment of FIGS. 1-3, except that the cathode screens are arranged in a diamond pattern throughout the length of the column.
FIG. 8 is a top view of a section of the apparatus embodiment of FIG. 7, taken along line 8—8 of FIG. 7, showing the top of one of the baffle plates in the column.
FIG. 9 is a top view of a section of the apparatus embodiment of FIG. 7, taken along line 9—9 of FIG. 7, which shows a portion of a cathode screen and a portion of one of the apertured plates in the column.

The electrodes may be orientated and arranged in any convenient manner. Either the anode or cathode, or both, may be single integral members or a plurality of members. The only requirement is that a porous membrane must separate the electrodes into two electrode chambers. Thus, the electrodes may be in the form of solid hollow tubes extending into the containers. These tubes may be arranged concentric to one another or situated alongside one another. For reasons of economy, particularly when the electrode members are constructed of noble metals, they are provided in the form of screens, thereby providing large surface areas, but diminishing the quantity of noble metal material required. In a preferred embodiment, the surface area of one of the electrode members, preferably the cathode member, is increased by providing a plurality of spaced screens. These screens may be disposed in any convenient configuration within its chamber, such as vertically, horizontally or in a diamond-type pattern, as shown in FIG. 7. Preferably, when a plurality of screens are employed, they are disposed laterally in proximity to pulse plates and/or baffle plates, as may be desired, and most preferably, are orientated perpendicular to the porous membrane.

Baffle plates are provided in order to afford a means of control over the flow of liquids in the container. The plates are dimensioned and positioned so as to provide a hold-up of liquids in the container and particularly to provide liquid hold-up in the vicinity of the cathode member. This is particularly important where the cathode constitutes a plurality of members. The number and arrangement of the baffles are not absolutely critical and may be readily optimized by persons skilled in the art, dependent on apparatus design and particular materials treated. In those embodiments where turbulence is created in liquid charged to the second electrode chamber by pulsing means, the baffle plates may serve as pulse plates by providing apertures in the baffle plates through which liquid is then pulsed. The number and arrangement of the apertures is not absolutely critical and may be readily optimized by persons skilled in the art, taking into consideration the desired baffling effects, if any, desired to be achieved by the apertured pulse plates. Preferably, in order to achieve the combination of effective pulsing and the hold-up in the desired areas of the container, a combination of apertured pulse plates and baffle plates are employed. The baffle plates, which as explained above, may serve as pulse plates, may also serve as the second electrode by merely constructing them out of a suitable electrically conductive material. In the preferred embodiment, however, a separate second electrode is provided, and baffle plates are additionally provided, with or without apertured pulse plates, depending on the turbulence-creating means employed.

In the broad aspects of the invention, any suitable means may be provided to create turbulence in liquid charged to the second electrode chamber. Critical to the obtainment of particularly good results in accordance with the preferred embodiments of the invention is the provision of certain specific types of turbulence-creating means. One such means is the provision of a rotatable shaft which extends longitudinally through the second electrode chamber. Agitator blades are mounted in spaced relation on the rotatable shaft and means are provided for rotating the shaft. Preferably, there should be provided a plurality of agitator blades which are spaced evenly along the shaft. In a more preferred embodiment, the shaft is free of agitator blades and the container is free of baffle plates in the vicinities of the end walls of the container. This provides relatively quiescent zones at the extremities of the container and permits separation of lighter organic and heavier aqueous phase in those regions.

In another embodiment, pulsing means are provided for creating turbulence in liquid charged to the second electrode chamber. This may comprise a plurality of apertured plates mounted in spaced relation within the second electrode chamber or conventional packing material within and means for pulsing liquid through the apertured plates and through the packing material. If a packing material is employed, it may constitute any of the conventional materials used in the art to pack columns such as distillation columns. Illustrative suitable packing material includes Raschig rings, glass beads and the like. The purpose is to provide a packed inert material with a large surface area. Any suitable means for creating the pulse waves may be employed. The pulse waves may be created, for example, by a hydraulic pulsing device located outside the container. This hydraulic pulsing device can pulse one of the liquids desired to be charged into the container through the apertured plates, preferably upwardly. The pulsed liquid may be supplied through the main feed source for the liquid, but preferably is provided through a separate leg. This is to permit a continuous supply of un-pulsed liquid to be fed into the container. In a still preferred embodiment, the container is free of pulse plates and baffle plates in the vicinity of the end walls thereof to provide relatively quiescent zones in those areas to permit settling of the heavier aqueous phase.

Preferably, the apparatus is provided with means for cooling at least one of the electrode chambers. This may comprise a liquid which is circulated within such electrode chamber, such as water or a dilute acid solution, such as dilute $HNO_3$, or a cooling coil which is inserted into the chamber as is shown, for example, in FIG. 13. Obviously, if one or more of the electrode chambers is to be cooled by circulation of a liquid, suitable accesses to and from the chambers and circulating means must be provided. In such an event, it is also desirable to provide cooling means for the recirculating liquid and a vent for releasing gases which may collect in the chamber.

The apparatus in the invention may be used for performing a variety of liquid-liquid extraction and electrolysis operations. In accordance with the preferred embodiment of the invention, the apparatus is particularly useful in processes in which it is desired to simultaneously change the valence state of a metal of variable valence state to effect its transfer to the aqueous phase and concentrate the metal of changed valence state in an aqueous solution. Co-pending U. S. applications Ser. Nos. 815,713 and 815,714, mentioned supra, claim procedures whereby these procedures are carried out in single stages. The present process, in one aspect, provides an improvement in these procedures, whereby valence state change, preferential ion transfer from one phase to another and concentration can be simultaneously effected within the same multi-stage apparatus. The process of the invention also provides a means for improving the efficiency of these separate procedures. In a preferred embodiment of the invention, separation of aqueous and organic phases may be effected simultaneously with the oxidation or reduction and concentration and in the same apparatus.

From a procedural standpoint, the valence of one or more metals of variable valence state in an organic solution is changed electrochemically by forming a dispersion between the organic solution and an immiscible aqueous solution and passing an electric current through the dispersion. The streams of aqueous solution and organic solution are preferably passed countercurrently in contact with each other. The dispersion is created so that a continuous aqueous phase is maintained in the system. The presence of a continuous aqueous phase may be monitored by observing the level of the interface between the aqueous and organic phases, by observing the weight of liquid in the column and by observing voltages maintained in the column. A drop in any of these conditions may indicate a shift towards a continuous organic phase. This must be avoided and the continuous aqueous phase may be maintained by adjusting the flow rates of organic and aqueous solutions so that a greater volume of aqueous solution is charged to the column, by regulating the intensity and amount of turbulence created in the dispersion or by suitable design of the baffles. If reduction (a lower valence state) is desired, the dispersion is allowed to contact the cathode of the electrolytic cell. If oxidation (a higher valence state) is desired, the dispersion is allowed to contact the anode of the electrolytic cell. The anode and cathode members may be interchanged by merely changing the polarity of the terminals of these members so that the electric current passes first into one rather than the other. Concentration of the metal in changed valence state in one of the phases, particularly the aqueous phase, may be accomplished by passing a continuous stream of an organic solution of the metal of variable valence state which is preferentially soluble in aqueous solution in its changed valence state through the column such that the flow-rate ratio of organic solution to aqueous solution is always greater than one. Provided that a continuous aqueous phase is maintained in the system, under these conditions there will result a simultaneous valence change of metal and concentration of the metal in the aqueous phase. The concentration factor will vary depending on the metals treated and the flow-rate ratios of organic solution to aqueous solution. This may be determined by routine experimentation. In the case of reduction of tetravalent plutonium to trivalent plutonium, the concentration factor is in direct proportion to the flow rate ratio of organic solution to aqueous solution. For example, if the flow rate ratio of organic to aqueous solution is 2:1, the plutonium will be concentrated in the aqueous solution by a factor of 2, i.e. it will be twice as concentrated in aqueous solution as originally charged in organic solution.

Any inert solvent which will dissolve the metal compound in the valence states desired may be employed. Organic solvents are convenient but may not dissolve heavy metal compounds such as those of uranium and plutonium. Such compounds, however, are known to form complexes which are soluble in organic solvents. Any complexing agent yielding a metal complex soluble in an organic solvent may be employed. Suitable complexing agents include the alkyl phosphates, aliphatic ketones such as hexone and aliphatic amines such as dioctylamine. The alkyl phosphates can be mono, di- or tri-esters of phosphoric acid derived from alkanols containing one to about eight carbon atoms such as butanol, hexanol, octanol and the like. Any inert organic solvent may be employed. The preferred solvents are hydrocarbons such as dodecane, kerosene, gasoline and the like. Tributyl phosphate in an amount of from 5 to 40 percent by weight in a hydrocarbon is preferably employed as solvent for metals formed in nuclear fuels, i.e. uranium, plutonium and neptunium, due to its high extraction selectivity. The proportion of organic solvent to complexing agent is not critical. Generally, enough of the organic solvent should be present to maintain a dispersion of the aqueous and organic solutions and prevent an emulsion from forming. Normally, at least about 5 percent by weight of the organic solvent in the complexing agent-solvent mixture will accomplish this purpose. The proportion of complexing agent in the mixture is preferably from 5-95 percent by weight of the mixture.

The aqueous solution must be immiscible with the organic solution and must be an electrolyte. Suitable aqueous solutions are dilute mineral acid or salt solutions, such as nitric acid, sodium nitrate and the like. In a reduction procedure, the aqueous solution may contain a stabilizer, such as hydrazine, to prevent reoxidation of the metals. A preferred concentration of hydrazine, if employed, is from ababout 0.01 to about 0.5M. In an oxidation procedure, an anti-reductant, such as $HNO_3$ or $HaNO_2$, could be added to the system.

When the concentration of the metal in the organic solution to be oxidized or reduced is quite low, the rate of the oxidation or reduction decreases and longer reaction times are required to complete the reaction. In order to increase the rate of reaction an internal reduction oxidation (redox) agent can be added to the system. Such redox agent is reduced or oxidized by the passage of a current through the cell. When the metal whose valence state is to be changed is to be reduced, the redox agent is reduced, in turn reduces the metal whose valence is to be reduced, and is itself oxidized back to its original valence state. The concentration of this agent will remain substantially constant. The addition of an internal redox agent is particularly effective when added to dilute solutions of tetravalent plutonium. A small amount of uranyl nitrate [$UO_2(NO_3)_2$] is generally added to the organic solution as the redox agent. During the reaction, the hexavalent uranium is reduced to tetravalent uranium, which reduces the tetravalent plutonium, and is then reoxidized to hexavalent uranium according to the equation:

$$2\ PU^{+4} + U^{+4} \rightarrow 2\ PU^{+3} + U^{+6}$$

The rate of this reaction is rapid and increases the rate of reduction of plutonium. The choice of uranium is particularly convenient in this instance since the hexavalent uranium and any tetravalent uranium will remain in the organic phase while most of the trivalent plutonium will transfer to the aqueous phase. Thus, the addition of the redox agent in this case will not contaminate the trivalent plutonium solution. This process is particularly useful for effecting the transfer of plutonium from an organic to an aqueous solution as is required for the purification processes employing solvent extraction, e.g., the "Purex" type process.

The electrochemical conversions may be carried out over a wide range of temperature and pressure conditions. The only limitations are the freezing point and the vapor pressure of the electrolyte. Means for heating, cooling or maintaining desired pressure conditions could accordingly also be provided.

The amount of electric current which is passed through the cell is not absolutely critical. The optimum rate is that which is high enough to give a satisfactory reaction rate but low enough so that an undesirable degree of corrosion or disintegration of the electrodes will not take place. The optimum amperage and voltage values to employ depend on the above factors and also on such factors as the configuration of the particular cell involved, the reaction rates desired and the particular materials treated. The determination of these optimum values and the maintenance of same in the electrolytic cell are within the skill of those persons skilled in the art of conducting electrolytic procedures.

The invention will now be fully described with particular reference to the embodiments shown in the drawings.

Figures 1, 2, 3:
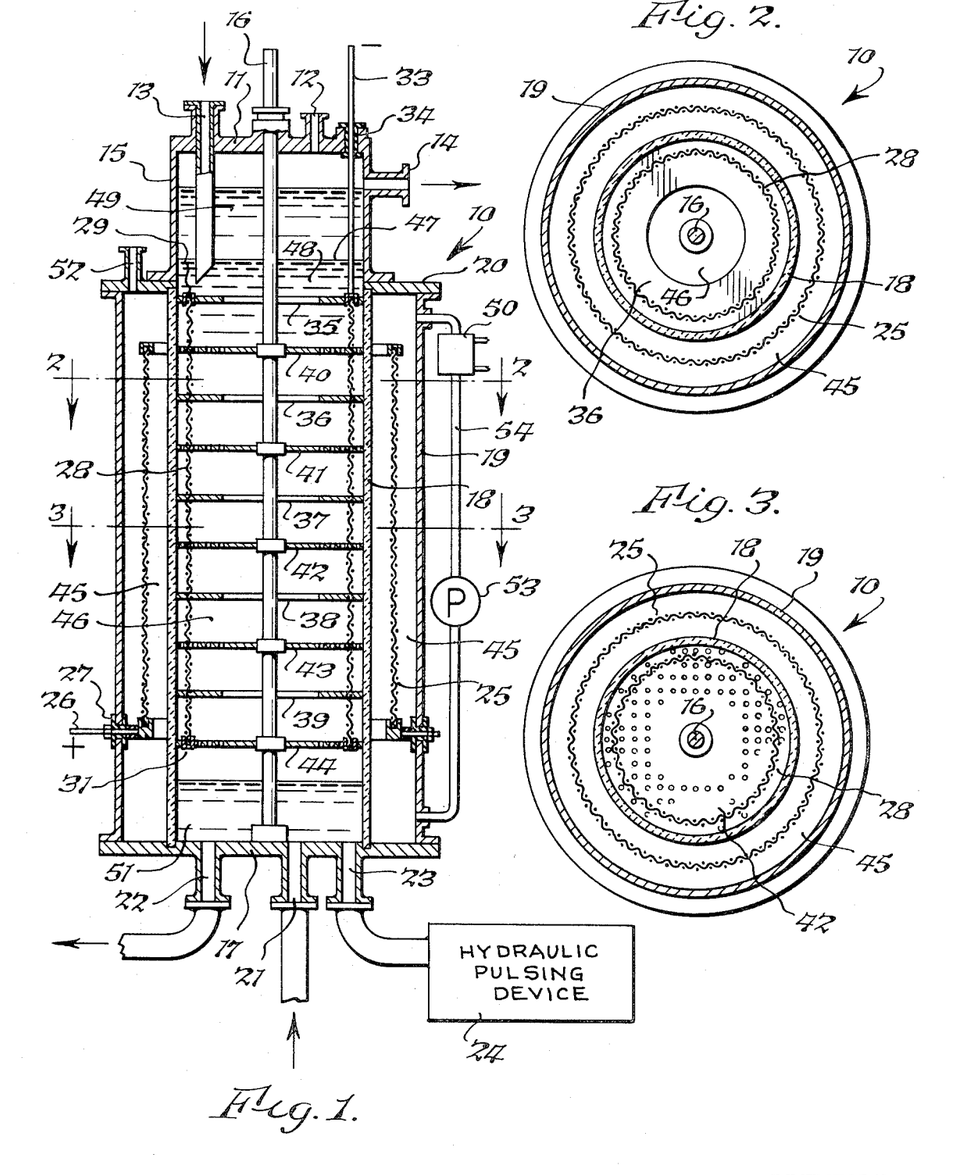
FIG. 1 is an elevational view in partial half section of an illustrative embodiment of the apparatus of the invention characterized by anode and cathode members which are hollow screens extending longitudinally within the container, and by pulsing means for creating turbulence.
FIG. 2 is a top view of a section of FIG. 1, taken along line 2—2 of FIG. 1, which illustrates a top view of one of the baffle plates in the column.
FIG. 3 is a top view of a section of FIG. 1, taken along line 3—3 of FIG. 1, which shows a top view of one of the apertured plates.

Referring to FIG. 1, the closed hollow container 10 serving as the electrolytic cell is preferably a column having one dimension substantially longer than the other which column is additionally characterized by having a wider diameter at the bottom than at the top. The smaller diameter side wall is shown as 15. The larger diameter side wall is shown as 19. Flange 20 connects walls 15 and 19. It is to be understood that when the term "closed" is employed, this is not necessarily intended to mean permanently closed. Thus, the column could be closed with removable closure members which, when in the closed position, will provide a gastight housing. Top end wall 11 of the cell is provided with a vent 12 for releasing hydrogen and other gases and also with an inlet 13 for admitting liquid to the top of the cell. An outlet 14 for removing liquid from the cell is located in the side wall 15 of the cell in proximity to the top of the cell. Support column 16 extends along the longitudinal axis of cell column 10 from bottom end wall 17 through top end wall 11. A porous ceramic membrane 18 which is in the shape of a hollow cylinder extends from flange 20 downwardly to bottom wall 17. Cell 10 is also provided with liquid inlet 21, liquid outlet 22 and pulsing leg 23 having access to the cell through bottom wall 17. Hydraulic pulsing device 24 is connected to pulsing leg 23. Cylindrical anode screen 25 is positioned between porous membrane 18 and cell wall 19 along a portion of the length of the column. Anode lead wire 26 connects anode screen 25 with an electric circuit and passes through cell wall 19 through insulator 27. The porous membrane 18, cell side wall 19, flange 20 and cell bottom wall 17 define anode chamber 45 which contains an anolyte solution which cools anode screen 25. Vent 52 is provided for the release of volatile gases from chamber 45. Pump 53 and return pipe 54 recirculate the anolyte solution. Cooling coil 50 is located on return pipe 54 to cool the recirculating liquid. The internal area defined by porous membrane 18 defines a cathode chamber 46. Cathode screen member 28 is suspended within cathode chamber 46 by means of supporting brackets 29 and 31. Cathode lead wire 33 connects cathode screen 28 to an electric circuit and passes through top wall 11 of cell 10 through insulator 34. Baffle plates 35, 36, 37, 38 and 39 are mounted on supporting column 16 in spaced relationship to one another. A top view of baffle 36 and its relationship to anode screen 25 and cathode screen 28 is shown in FIG. 2. Apertured plate members 40, 41, 42, 43 and 44 are mounted on supporting column 16 in alternating relationship with baffle plates 35–39. The apertured plates have regularly arranged apertures around the circumference thereof, but are not perforated in the center. The arrangement of the apertures is shown by the top view of aperture plate 42 in FIG. 3. Supporting column 16 does not have any apertured plates or baffle plates at its uppermost end or lowermost ends thereby leaving disengaging zones or quiescent zones in which no turbulence is created and in which settling of the heavier aqueous phase can take place. Separation of the immiscible organic and aqueous phase takes place in the top disengaging zone which is defined by the distance from uppermost baffle plate 35 to outlet 14. The bottom disengaging zone is defined by the distance between the lowermost apertured plate 44 and the bottom wall 17. A pool of aqueous liquid will collect in this zone.

In the operation of the cell illustrated in FIGS. 1–3, a measured volume of a metal of variable valence state in organic solution is charged to cathode chamber 46 which contains an equal volume of an aqueous catholyte solution. Anode chamber 45 is filled with a suitable anolyte solution. Additional aqueous solution and additional organic solution are continuously fed into cathode chamber 46 through inlets 13 and 21, respectively. At the same time, both solutions are pulsed in the cathode chamber 46 through pulse leg 23 upwardly through apertured pulse plates 40, 41, 42, 43 and 44. The flow rate of the total volume of organic solution fed to cathode chamber 46 is adjusted as desired in relation to the rate at which the aqueous catholyte solution is fed to the chamber. The organic and aqueous solutions contact each other in cathode chamber 46 and form a dispersion characterized by the presence of a continuous aqueous phase. At the same time, an electric current is passed through the dispersion in the cathode chamber 46 of the cell. Reduction of reducible metal of variable valence state takes place and any metal of lower valence state which is preferentially soluble in aqueous solution passes into the aqueous phase. Separation of aqueous and organic phases takes place in the top disengaging or quiescent zone of the column wherein the interface is designated by 47, the heavier aqueous-continuous dispersion is shown by 48 and the lighter organic phase is shown by 49. A pool of aqueous liquid collects in the bottom disengaging zone which is shown by 51. Aqueous solution is withdrawn from the system through outlet 22; organic solution is withdrawn from the system through outlet 14.

In the description of the remaining Figures, in order to facilitate description by comparison with the embodiment of FIGS. 1–3, similar components will be shown with the same numerals.

Figures 4, 5, 6:
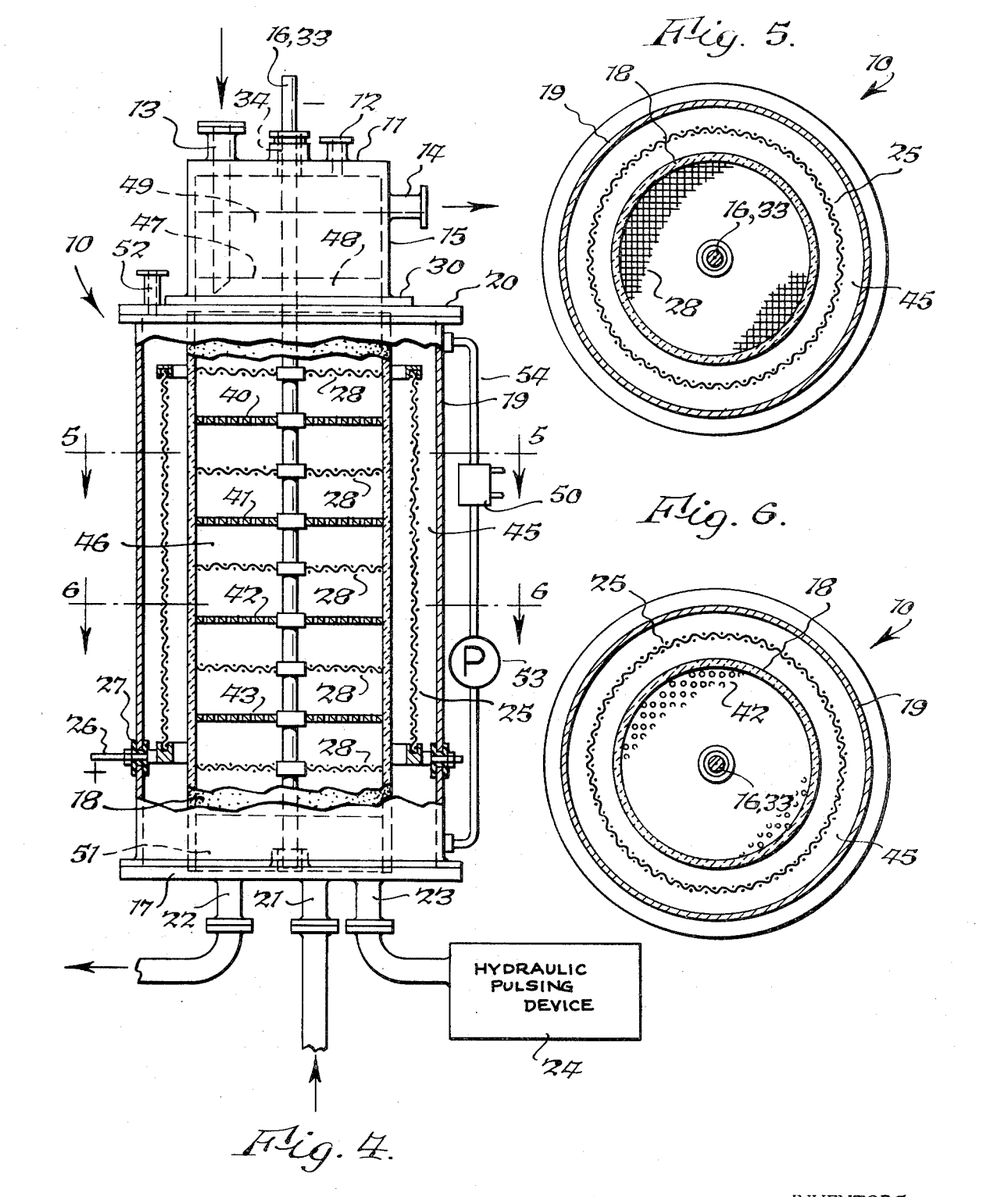
FIG. 4 is an elevational view in partial half section of another embodiment of the apparatus of the invention which is similar to the embodiment shown in FIGS. 1-3, except that the cathode comprises a plurality of horizontally disposed screens within the cathode chamber.
FIG. 5 is a top view of a section of FIG. 4, taken along line 5—5 of FIG. 4, showing the top view of one of the horizontally disposed screens within the cathode chamber.
FIG. 6 is a top view of a section of FIG. 4, taken along line 6—6 of FIG. 4, showing a top view of one of the apertured plates.

FIGS. 4, 5, and 6 illustrate another embodiment of the invention which is identical to that shown by FIGS. 1–3 with the following differences: In this embodiment, cathode screen 28, in lieu of being a vertical hollow tube as shown in FIGS. 1–3, constitutes a plurality of laterally disposed screens which are disposed perpendicular to the porous membrane and which alternate with the pulse plates. The embodiment of FIGS. 4–6 has no separate baffle members. The apertured plates are perforated only over a small portion of their surface and the unperforated portions serve as the baffling means. Another difference is that the cathode lead wire 33, instead of being a separate component as shown in FIG. 1, is now the supporting column 16 which is in contact with all the cathode screen members 28. In FIG. 4, this is shown by the designation 16, 33.

The embodiment of FIGS. 7–9 is similar to the embodiment of FIGS. 4–6 with the following differences. The electrode screen members 28 are arranged in a diamond type configuration throughout the length of the column. The polarity of the electrodes in this embodiment is reversed so that screen members 28 are now the anode and screen member 25 is now the cathode. Lead wire 33 conducts electricity from screen members 28. In this embodiment baffles are provided in addition to pulse plates. As in FIG. 1, the baffles are shown by the numerals 35–39 and the pulse plates are shown by numerals 40–44.

Figures 10, 11, 12:
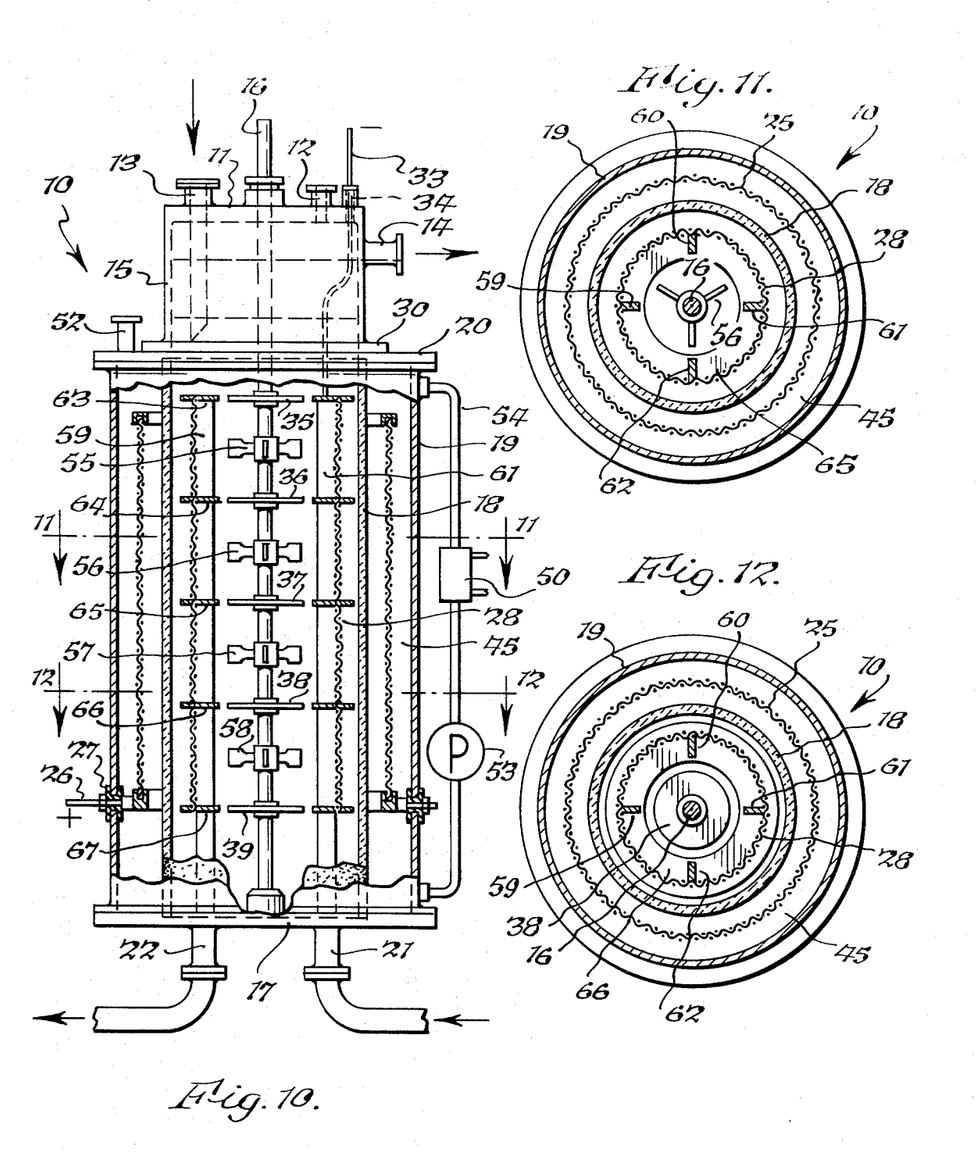
FIG. 10 is an elevational view in partial half section of another embodiment of the invention, which apparatus contains concentric electrode screens, a plurality of baffle plates, and means for creating turbulence which comprises a rotatable shaft extending longitudinally through the chamber, agitator blades mounted on the shaft and means for rotating the shaft.
FIG. 11 is a top view of a section of FIG. 10, taken along line 11—11 of FIG. 10, showing the orientation of the circular screens and the arrangement of several agitator blades on the rotatable shaft.
FIG. 12 is a top view of a section of the apparatus embodiment of FIG. 10, taken along line 12—12 of FIG. 10, showing a top view of one of the baffle plates.

The embodiment of FIGS. 10–12 is similar to that of FIGS. 1–3, except that in this embodiment agitator blades are used to create turbulence in the cell instead of pulse waves. 16 is a rotatable shaft. Agitator blades 55, 56, 57 and 58 are mounted in spaced relationship on rotatable shaft 16. Horizontal baffles 35, 36, 37, 38 and 39 in the form of discs are mounted on shaft 16 in alternating relationship with agitator blades 55, 56, 57 and 58. Vertical baffle members 59, 60, 61 and 62, as best seen in FIG. 12, support cathode screen 28 and annular baffle members 63, 64, 65, 66 and 67. In this embodiment, pulse leg 23 and pulsing device 24 are omitted. In FIG. 11, for reasons of clarity, horizontal baffle 37 is not shown.

Figures 13, 14, 15:
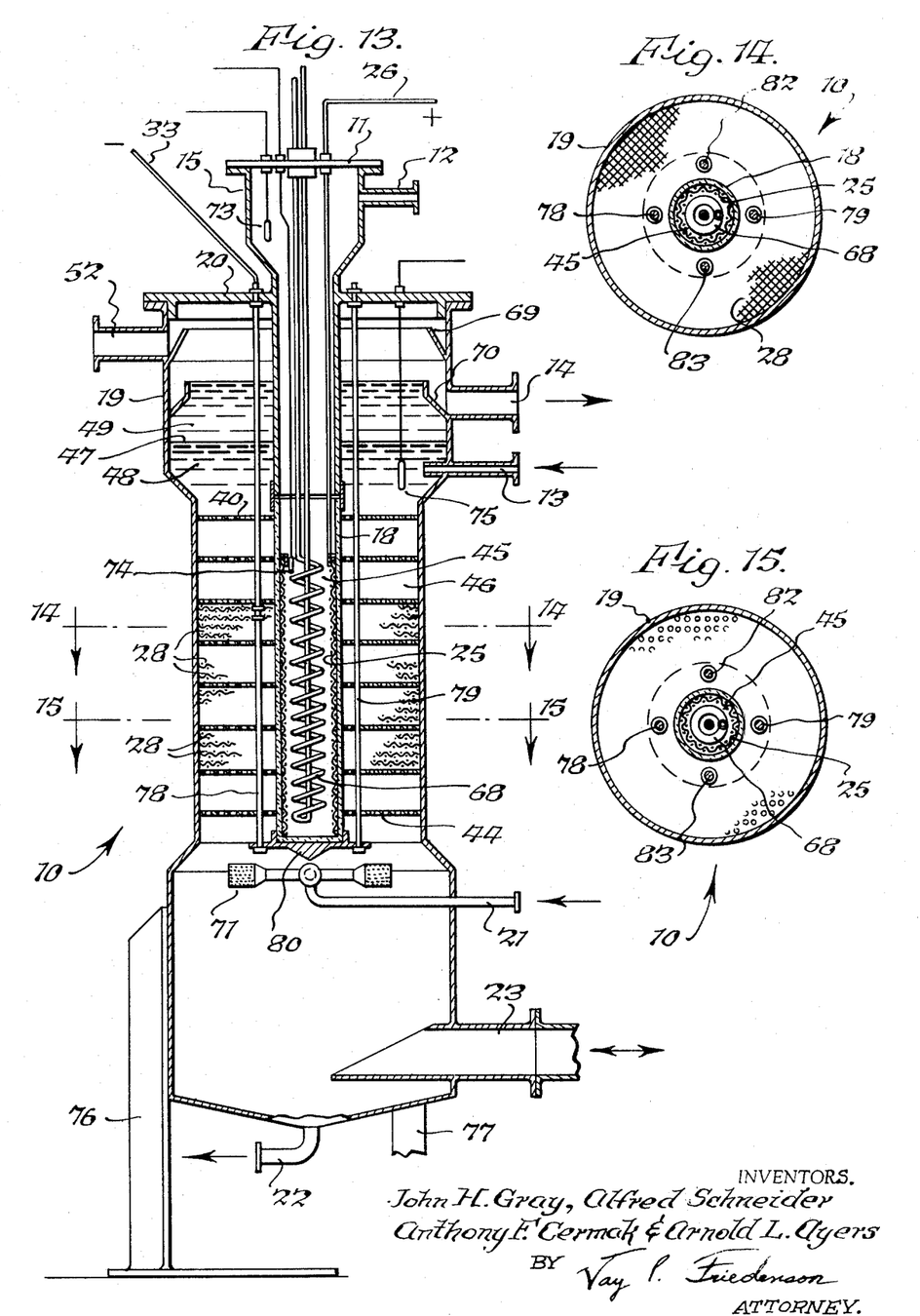
FIG. 13 is an elevational view in partial half section of another embodiment in accordance with the invention which is provided with baffle plates, an internal longitudinally disposed anode screen, a cathode which constitutes a plurality of spaced horizontally disposed screens, and pulsing means for creating turbulence.
FIG. 14 is a top view of a section of the apparatus embodiment of FIG. 13, taken along line 14—14 of FIG. 13, showing the top of one of the horizontally disposed screens and its relationship to the internal anode screen.
FIG. 15 is a top view of a section of the apparatus embodiment of FIG. 13, taken along line 15—15 of FIG. 13, which shows a top view of one of the apertured plates in the column and its relationship to the internal anode screen.

The embodiment of FIGS. 13–15 is similar to the embodiment of FIGS. 4–6, with the following differences. Anode chamber 45 and anode screen 25 are internal of cathode chamber 46. Cooling coil 68 is shown within the anode chamber. Perforated plates 40 and 44 are shown as the end plates of a spaced group of eight plates, six of which are not numbered. Vent 52 is in side wall 79. The vent is partially blocked by annular baffle member 69 to prevent liquid droplets from escaping therethrough. Some additional components and instrumentation lines are shown in FIGS. 13–15. Trough 70 is provided to facilitate run-off of liquid through outlet 14. Distributor head 71 is provided at the bottom of the column to distribute organic feed solution from inlet 21 around anode chamber 45 upwardly through the perforated plates. Temperature sensing devices 73, 74 and 75 are shown for monitoring temperature in different portions of the unit. Depending on the readings obtained, the temperature in the monitored spaces may be regulated by any conventional means such as cooling coil 68 in anode chamber 45. Supporting legs 76 and 77 are shown in FIG. 13. Support rods 78, 79, 82 and 83 and supporting bracket 80 support the suspension of porous membrane 18 within the cell.

Figures 16, 17:
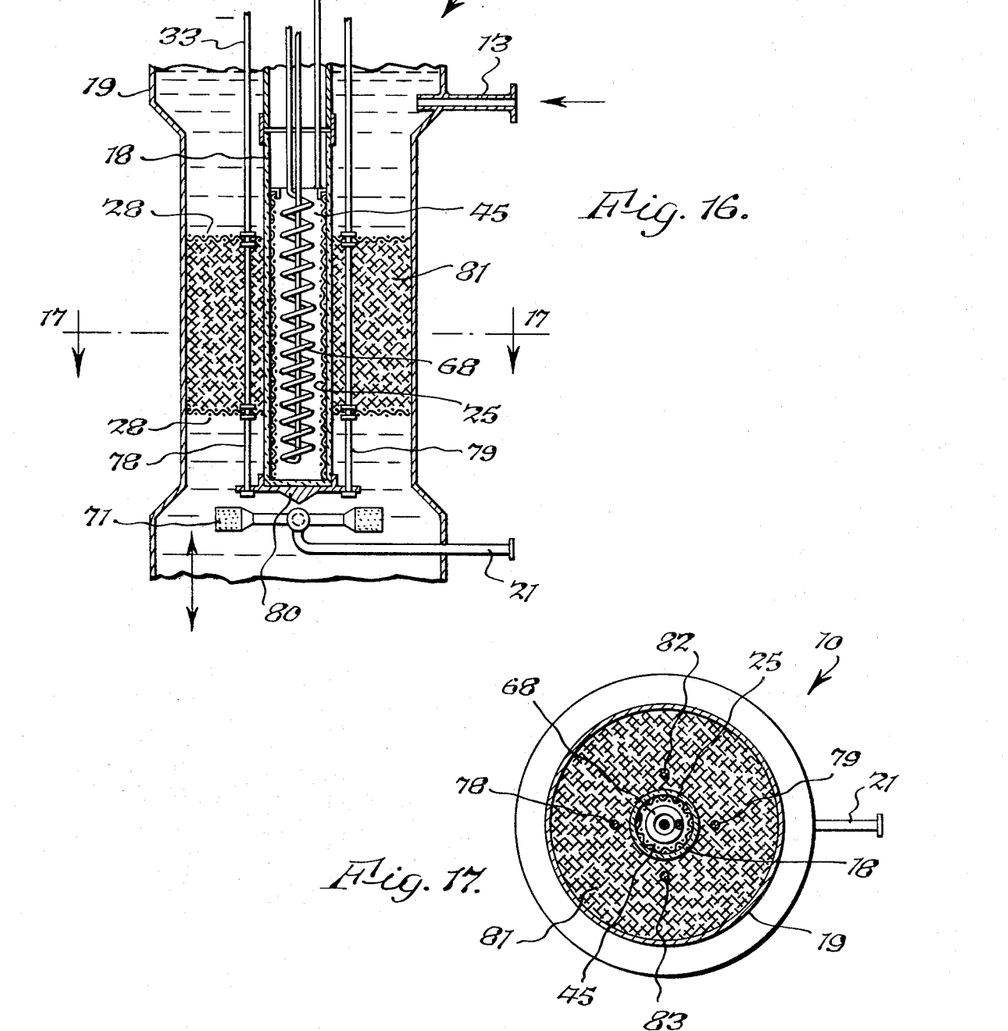
FIG. 16 is a partial elevation in partial half section of another embodiment of the invention in which the anode is an internal longitudinally disposed hollow screen member, the cathode constitutes a plurality of horizontally disposed screens, and in which the means for creating turbulence in the second electrode chamber comprises packing throughout the second electrode chamber and means for pulsing a liquid through the packing.
FIG. 17 is a top view of a section of FIG. 16, taken along line 17—17 of FIG. 16, showing a top view of a section of the packed second electrode chamber and a section of the internal anode chamber.

The embodiment of FIGS. 16 and 17 is similar to the embodiment of FIGS. 13-15. Only that portion of the cell between aqueous inlet 13 and organic inlet 21 is shown. Instead of the spaced apertured plates, the column is packed with Raschig rings shown by the numeral 81, which are retained by cathode screen members 28. (Both members are shown by the numeral 28 in FIG. 16).

The following illustrate typical specifications and conditions for illustrative electrolytic reduction or oxidation procedures in accordance with the invention. The data are presented in tabular form. Each example, as indicated, corresponds to a process carried out in one of the embodiments shown by FIGS. 1, 7, 10 or 13. Unless otherwise specified, the material of construction is stainless steel. In all the examples, the internal diameters of organic inlet 21, organic outlet 14, pulse leg 23 (where applicable), aqueous outlet 22 and aqueous inlet 13, are 1 inch. The supporting or rotating column 16 has an internal diameter of one-half inch. The numbers in the first column of the table which are indicated parenthetically are the numerals used on the drawings for these parts.

|  | FIG. 1 | FIG. 7 | FIG. 7 | FIG. 10 | FIG. 13 |
|---|---|---|---|---|---|
| Apertured plates (40-44) | Diameter—4⅜"<br>Free area—20% | Diameter—4⅜"<br>Free area—15% | Diameter—4⅜"<br>Free area—15% |  | Diameter—19⅞".<br>Free area—15%. |
| Baffle plates (35-39) | Diameter—4⅜"<br>Free area—15% | Diameter—4⅜"<br>Free area—10% | Diameter—4⅜"<br>Free area—20% | Diameter—4⅜"<br>Free area—25% |  |
| Cathode | Platinum or gold.<br>Cylindrical screen.<br>Mesh* size—28.<br>Cylinder diameter 5⅞".<br>Length—20". | Platinum or gold.<br>Cylindrical screen.<br>Mesh size—20.<br>Cylinder diameter 5⅞".<br>Length—20". | Platinum or gold.<br>Cylindrical screen.<br>Mesh size—20.<br>Cylinder diameter 5⅞".<br>Length—20". | Platinum or gold.<br>Cylindrical screen.<br>Mesh size—16.<br>Cylinder diameter 4⅞".<br>Length—20". | Platinum or gold.<br>Disc screens.<br><br>Diameter 19⅞". |
| Anode | Platinum cylindrical screen.<br>Mesh size—20.<br>Cylinder diameter 5⅞".<br>Length—20". | Platinum funnel screen.<br>Mesh size—16.<br>Cylinder diameter max. 4½", min. 1".<br>Length—20". | Platinum funnel screen.<br>Mesh size—16.<br>Cylinder diameter max. 4½", min. 1".<br>Length—20". | Platinum cylindrical screen.<br>Mesh size—20.<br>Cylinder diameter 5⅞".<br>Length—20". | Platinum cylindrical screen.<br>Mesh size—20.<br>Cylinder diameter 4⅞".<br>Length—16". |
| Cathode lead wire | Platinum or gold.<br>Diameter—¼". | Platinum or gold.<br>Diameter—¼". | Platinum or gold.<br>Diameter—¼". | Platinum or gold.<br>Diameter—¼". | Platinum or gold.<br>Diameter—¼". |
| Anode lead wire | Platinum.<br>Diameter—¼". | Platinum.<br>Diameter—¼". | Platinum.<br>Diameter—¼". | Platinum.<br>Diameter—¼". | Platinum.<br>Diameter—¼". |
| Porous membrane (18) | Sintered $Al_2O_3$; length—32"; I.D.—5"; wall thickness—¼"; pore diameter—1-10 microns. | Sintered $Al_2O_3$; length—32"; I.D.—5"; wall thickness—¼"; pore diameter—1-10 microns. | Cationic ion exchange resin. | Sintered $Al_2O_3$; length—32"; I.D.—5"; wall thickness—¼"; pore diameter—1-10 microns. | Sintered $Al_2O_3$; length—32"; I.D.—5"; wall thickness—¼"; pore diameter—1-10 microns. |
| Disengaging (quiescent) zones** | Height—20"<br>I.D.—5" | Height—20"<br>I.D.—5" | Height—20"<br>I.D.—5" | Height—20"<br>I.D.—5" | Height—20".<br>I.D.—5". |
| Aperatured plate spacing, inches | 3 | 3 | 3 |  | 4. |
| Baffle plate spacing, inches | 3 | 3 | 3 | 3 |  |
| Cathode zone (height in inches) | 20 | 20 | 20 | 20 | 16. |
| Apertured plate zone (height in inches) | 20 | 20 | 20 |  | 32. |
| Baffle plate zone (height in inches) | 20 | 20 | 20 | 20 |  |
| Anolyte | 2$M$ $HNO_3$ | 2$M$ $HNO_3$ | 2$M$ $HNO_3$ | 2$M$ $HNO_3$ | 2$M$ $HNO_3$. |
| Catholyte | 3$M$ $HNO_3$, and 30 vol. percent tributyl phosphate in N-dodecane. | 3$M$ $HNO_3$, and 30 vol. percent tributyl phosphate in N-dodecane. | 3$M$ $HNO_3$, and 30 vol. percent tributyl phosphate in N-dodecane. | 3$M$ $HNO_3$, and 30 vol. percent tributyl phosphate in N-dodecane. | 3$M$ $HNO_3$, and 30 vol. percent tributyl phosphate in N-dodecane. |
| Metal and initial valence state.ᵃ | $U^{16}(UO_2^{++})$ (uranyl nitrate). | $Np^{+4}$ (neptunium nitrate). | $Pu^{+4} + Np^{+4}$ | $Pu^{+4}$ | $U^{16}(UO_2^{++})$ (uranyl nitrate). $Pu^{+4}$ (plutonium nitrate). |
| Aqueous flow rate (liters/minute) | 1 | 1 | 1 | 1 | 1. |
| Organic flow rate (liters/minute) | 2 | 4 | 4 | 8 | 8. |
| Aqueous to organic volume in electrolytic zone. | 7 | 5 | 5 | 10 | 5. |
| Pulse frequency (cycles) | 60 | 60 | 60 | Agitator speed 350 rpm | 90. |
| Pulse amplitude (inches) | ⅜ | ⅜ | ⅜ |  | ½. |
| Voltage | 4.5 | 4.5 | 4.5 | 4.5 | 7. |
| Current density (amps/cm²) | 0.05 | 0.05 | 0.05 | 0.05 | 0.05. |

| | FIG. 1 | FIG. 7 | FIG. 7 | FIG. 10 | FIG. 13 |
|---|---|---|---|---|---|
| Time of operation (hrs.) | 2 | 3 | 3 | 3 | 3 |
| Final valence state of metal.[a] | $U^{+4}$ | $Np^{+5}(NpO_2^+)$ | $Pu^{+4} + Np^{+5}(NpO_2^+)$ ($Np^{+5}$ transfers preferentially to aqueous phase). | $Pu^{+3}$ | $Pu^{+3} + U^{+4}$ ($Pu^{+3}$ transfers preferentially to aqueous phase). |
| Concentration factor | ~ 2[***] | ~ 2 | ~ 2 for $Np^{+5}$ | ~ 8 | ~ 8 for $Pu^{+3}$ |

[*] All mesh sizes are of the U.S. standard screen.

[**] The top disengaging zone is the distance between the uppermost baffle plate, aperture plate, or top of the packed zone and the level defined by organic outlet 14. The bottom disengaging zone is the distance between the lowermost baffle plate or apertured plate on the bottom of the packed zone and the bottom wall 17 of the cell. These disengaging zones are equal in height.

[a] The use of uranium, plutonium or neptunium for each of the figures presented was for illustrative purposes. Any or any combination of these elements may be used in all of the figures.

[***] Approximates.

We claim:

1. Apparatus for performing liquid-liquid extraction and electrolysis which comprises:
   a. A closed packed hollow column,
   b. a vent for gases at the top of the column,
   c. an inlet and an outlet for liquid at one end of the column,
   d. an inlet and an outlet for liquid at the opposite end of the column,
   e. a first electrode member mounted within the container,
   f. a second electrode member mounted within the container,
   g. a porous membrane separating the two electrode members, thereby defining
   h. a first electrode chamber and
   i. a second electrode chamber,
   j. means for pulsing liquid through the column.

2. Apparatus according to claim 1 in which the means for pulsing liquid through the column includes packing material.

3. Apparatus according to claim 1 in which the means for pulsing liquid through the column includes a plurality of apertured plates.

4. Apparatus for performing liquid-liquid extraction and electrolysis which comprises:
   a. A closed hollow container,
   b. a vent for gases at the top of the container,
   c. an inlet and an outlet for liquid at one end of the container,
   d. an inlet and an outlet for liquid at the opposite end of the container,
   e. a first electrode member mounted within the container,
   f. a second electrode member mounted within the container,
   g. a porous membrane separating the two electrode members, thereby defining
   h. a first electrode chamber and
   i. a second electrode chamber,
   j. a plurality of baffle plates mounted in spaced relation within the second electrode chamber which baffle plates may optionally be constructed of an electrically conducting material and, in such an event, may replace the second electrode,
   k. a plurality of apertured plates mounted in spaced relation within the second electrode chamber, and
   l. means for pulsing liquid through the apertures.

5. Apparatus according to claim 4 which includes a plurality of baffle plates as described therein in addition to the first and second electrodes.

6. Apparatus according to claim 5 in which one or more of the baffle plates are disposed substantially horizontally in the container.

7. Apparatus according to claim 6 in which the closed container is a column having one dimension substantially longer than the other.

8. Apparatus according to claim 4 in which the column is free of apertured plates in the vicinities of the end walls of the column.

9. Apparatus according to claim 8 in which the electrode members are screens of electrically conductive metals.

10. Apparatus according to claim 9 in which the electrode screens are constructed of noble metals.

11. Apparatus according to claim 9 in which the porous membrane is a porous ceramic membrane.

12. Apparatus according to claim 11 in which the porous ceramic membrane is sintered $Al_2O_3$.

13. Apparatus according to claim 11 in which one of the electrode members constitutes a plurality of spaced screens.

14. Apparatus according to claim 11 in which the electrodes are screens of noble metals, one electrode constitutes a plurality of spaced screens, and in which the porous membrane is constructed of sintered $Al_2O_3$.

15. Apparatus according to claim 8 in which:
   a. the first electrode is in the form of a hollow tube extending within the column, and
   b. the porous membrane is in the form of a hollow tube extending within the column and surrounding the first electrode.

16. Apparatus according to claim 15 in which the first electrode is in the form of a screen.

17. Apparatus according to claim 16 in which the second electrode constitutes a plurality of spaced screens.

18. Apparatus according to claim 17 in which each of the spaced screens is orientated perpendicular to the porous membrane.

19. Apparatus according to claim 18 in which the electrode screens are constructed of noble metals.

20. Apparatus according to claim 19 in which the porous membrane is constructed of sintered $Al_2O_3$.

21. Apparatus according to claim 20 in which the first electrode chamber is provided with cooling means.

22. Apparatus according to claim 21 in which the noble metals are selected from gold and platinum.

* * * * *

UNITED STATES PATENT OFFICE
CERTIFICATE OF CORRECTION

Patent No. 3,770,612      Dated November 6, 1973

Inventor(s) John H. Gray, Alfred Schneider, Anthony F. Cermak and Arnold L. Ayers It is certified that error appears in the above-identified patent and that said Letters Patent are hereby corrected as shown below:

Cover Page under heading [75] Inventors, "Cormak" should be -- Cermak --;

Cover Page under heading [57] Abstract, line 1 "performing a liquid" should read -- performing liquid --;

Col. 2, line 20, "electro-lytic" should be -- electrolytic --;

Col. 3, line 18, "member" should be -- chamber --;

Col. 9, line 48, "ababout" should be -- about --;

Col. 9, line 50, "NaNO$_2$" should be -- H$_2$O$_2$ --;

Col. 15, line 16, "A closed packed hollow" should read -- A closed hollow --.

Signed and sealed this 7th day of May 1974.

(SEAL)
Attest:

EDWARD M. FLETCHER, JR.
Attesting Officer

C. MARSHALL DANN
Commissioner of Patents